United States Patent [19]

Bronnert

[11] Patent Number: 4,787,304
[45] Date of Patent: Nov. 29, 1988

[54] APPARATUS FOR STERILIZATION OF LIQUIDS

[76] Inventor: Hervé X. Bronnert, 21495 Partridge Ct., Brookfield, Wis. 53005

[21] Appl. No.: 96,358

[22] Filed: Sep. 11, 1987

[51] Int. Cl.$^4$ .................................................. A23C 3/02
[52] U.S. Cl. ........................................ 99/453; 99/483; 99/516; 422/26; 422/307
[58] Field of Search .................. 99/452–455, 99/467, 470, 471, 483, 473–476, 516, 534; 426/520–522, 26, 307; 261/108, 112, 115–118; 159/4 R, 4 A; 422/26, 307; 239/419, 422–424, 432, 518

[56] References Cited

U.S. PATENT DOCUMENTS

| | | | |
|---|---|---|---|
| 3,555,991 | 1/1971 | Strakhov et al. | 99/455 |
| 4,310,476 | 1/1982 | Nahra et al. | 99/453 X |
| 4,375,185 | 3/1983 | Mencacci | 99/483 X |
| 4,390,350 | 6/1983 | Palm | 99/453 X |
| 4,432,276 | 2/1984 | Catelli | 99/453 X |

Primary Examiner—Timothy F. Simone
Attorney, Agent, or Firm—Ronald E. Barry

[57] ABSTRACT

An infusion heating apparatus, including a hollow sealed vessel having a porous steam dispensing cylinder located along the central axis of the vessel, a number of spray nozzles mounted in a circle at the top of the vessel and arranged to introduce a liquid form material to be treated in a continuous shower of droplets directed radially and downwardly between the interior walls of the vessel and the steam dispensing cylinder, a frusto-conical cylindrical member mounted in the housing below the spray nozzles to separate the shower of droplets from the dispensing cylinder, an air and gas discharge tube passing axially through the dispensing cylinder and terminating at the bottom of the vessel and a cooling jacket surrounding the outside surface of the vessel.

14 Claims, 3 Drawing Sheets

APPARATUS FOR STERILIZATION OF LIQUIDS

BACKGROUND OF INVENTION

Directing heat-sensitive liquid form materials, such as dairy products, through an apparatus filled with steam, has been attempted using various devices. All known prior art apparatus have been plagued with the problem of burn-on. Burn-on occurs when heat-sensitive liquid form material touches a surface hotter than itself. In addition, burn-on builds up so rapidly on the heated interior surface of the apparatus that it flakes off and drops into the product itself.

Burn-on is particularly adverse to dairy products. When dairy products touch a surface warmer than itself, it acts on the proteins which will precipitate on to the warmer surface. As a layer of protein forms on the warmer surface, this layer also increases the thermal insulation formed by the wall with the cooler outside temperature. At the next cycling when steam reaches this layer of Protein covering the apparatus, a warmer surface temperature results. When the product comes back again, it comes over a warmer surface than before, more protein precipitates on the first layer than initially. This results in a rapid excessive build-up of burn-on. In addition to layers of protein precipitating on the warmer surface, the successive exposure to the top temperature on the steam denatures these layers and transforms them into what is called "burnt protein." This changes their color anywhere from light to dark brown with a characteristic unpleasant odor and taste which is then transferred to the product being processed.

In most prior devices, burn-on is also created by disadvantages in the design of the apparatus. It has been the common practice to expose the film of liquid form material directly to live steam at the very instant of the introduction of the film into the apparatus. Burn-on which occurs at this point cannot be prevented, resulting in operational problems due to the liquid form material film being broken down or interrupted. As the film is broken down or interrupted, splashing and additional burn-on results.

A second disadvantage in prior art devices is the creation of an "intermediate zone" where liquid form material and steam alternate resulting in additional burn-on. The heat-sensitive liquid form material is introduced in such a way that only a portion or fraction of the interior surfaces of the heated apparatus are covered with the liquid form material. This incomplete coverage of the heat-sensitive liquid form material on the internal surface of a heated apparatus always creates an intermediate zone. This alternating of a product and steam on the same surface is disastrous because each time the product progresses over the area just exposed to the steam, the product comes in contact with a surface warmer than itself. The repetition of alternating steam and liquid material over the same surface accelerates "burn-on" resulting in a rapid excessive buildup.

A further problem is caused by "hunting" which is attributed to the action of the control and level system. This "hunting" results from a variety of variables present, such as steam pressure, pumping, product viscosity, level control, etc. The level control alone varies because of its chain of action. The level change is sensed by the level sensors which transfer this information to the level transmitter which sends a signal to the level controller which sends the signal to another transmitter which finally acts on a flow control valve positioner or on a flow control pump. With this type of a flow control system, it is difficult to maintain a constant level since the margin of error of each instrument in the chain of level control adds to the delay in responding to changes of level.

In my co-pending application, Ser. No. 872,135 filed on 6/9/86 and entitled "Method and Apparatus for Sterilization of Liquids," an apparatus is described which utilizes both a film-forming gap to provide a film of liquid material down the inside surfaces of the vessel and a spray system which provides a shower of droplets between the interior wall vessel and the steam source. In the present application, an apparatus is described which eliminates the film-forming system and utilizes a spray system which provides both the film of liquid on the interior wall of the vessel, as well as a shower of droplets between the film and the steam system.

SUMMARY OF THE INVENTION

In the present invention, liquid form material is introduced through a multiple number of shower droplet generating devices which are generally oriented parallel and downward to the centerline of the auxiliary chamber and are positioned in a circular arrangement that provides a film forming material on both the interior surface of the vessel, as well as the interior surface of the auxiliary chamber, plus a circular rotation of shower droplets in the vessel which separate the steam from the interior surfaces of the vessel.

One of the principal features of the present invention is the combination of different spray angles from each of the droplet generating devices that produce a full pattern shower that completely fills the auxiliary chamber, but also generates a layer of liquid form material on the internal surfaces of the auxiliary chamber, on the showering devices themselves, their adjacent surfaces, vertical upper side and bottom internal surfaces of the vessel. From the auxiliary chamber the continuous circular shower or spray of droplets from the shower devices reach out to assist and sustain the film on all of the internal walls.

Another feature of the invention is the provision for cooling the exterior surfaces of the chamber. A further advantage of the invention is that a gradient of temperature is established in the midst of the flowing product film thickness. This gradient is on one side of the product film, near the temperature of the steam, and on the other side, near the temperature of the infuser inner wall skin. With this arrangement, a liquid form material truly isolates and insulates the inner wall surfaces from the steam. Prior art, which allows a liquid form material to touch the interior wall only after the product has reached high temperatures, limits the ability to use the wall as a guide and support for the liquid form material. When the interior surface wall and product are at the apparatus heating temperature, capillary and surface tension are at their weakest. If the steam is barred from acceding to any internal wall of the apparatus, the apparatus internal surfaces are cooler than the product. Therefore, a better bond is achieved which maintains the liquid form material and contact with the guiding and supporting surfaces of the wall from the moment it is introduced into the apparatus until it leaves.

Other principal features and advantages of the invention will become apparent to those skilled in the art upon review of the following detailed description, claims and drawings.

DRAWINGS

Figure 1:
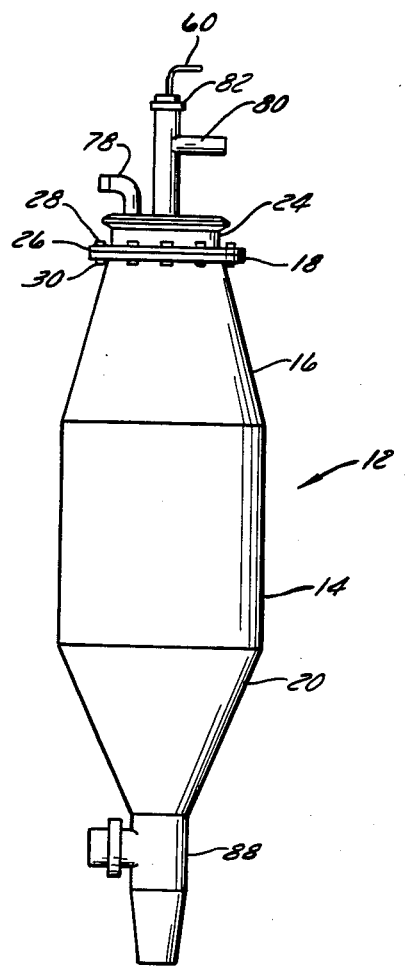
FIG. 1 is a side elevation view of the infusion heating apparatus according to the invention.

Before one embodiment of the invention is explained in detail, it is to be understood that the invention is not limited in its application to the details of construction and the arrangements of other components set forth in the following illustrated in the drawings. The invention is capable of other embodiments and being practical or being carried out in various ways. Also, it is to be understood that the phraseology and terminatology used herein is for the purpose of description and should not be regarded as limiting.

DESCRIPTION

Figure 2:
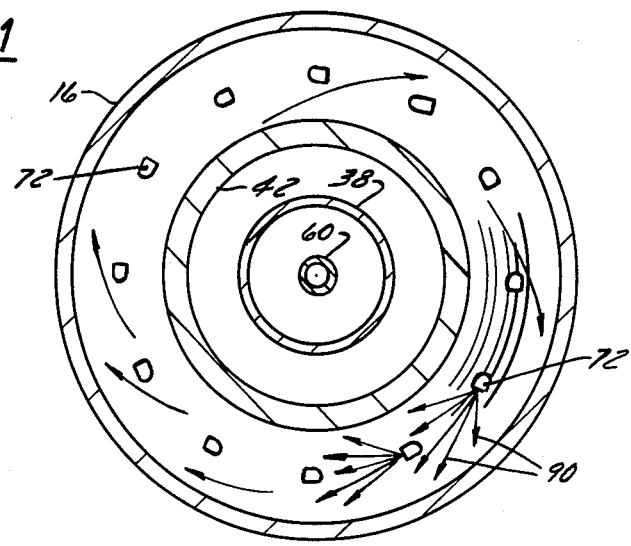
FIG. 2 is a cross-sectional view of the upper portion of the infusion heating apparatus of FIG. 1.
Figure 3:
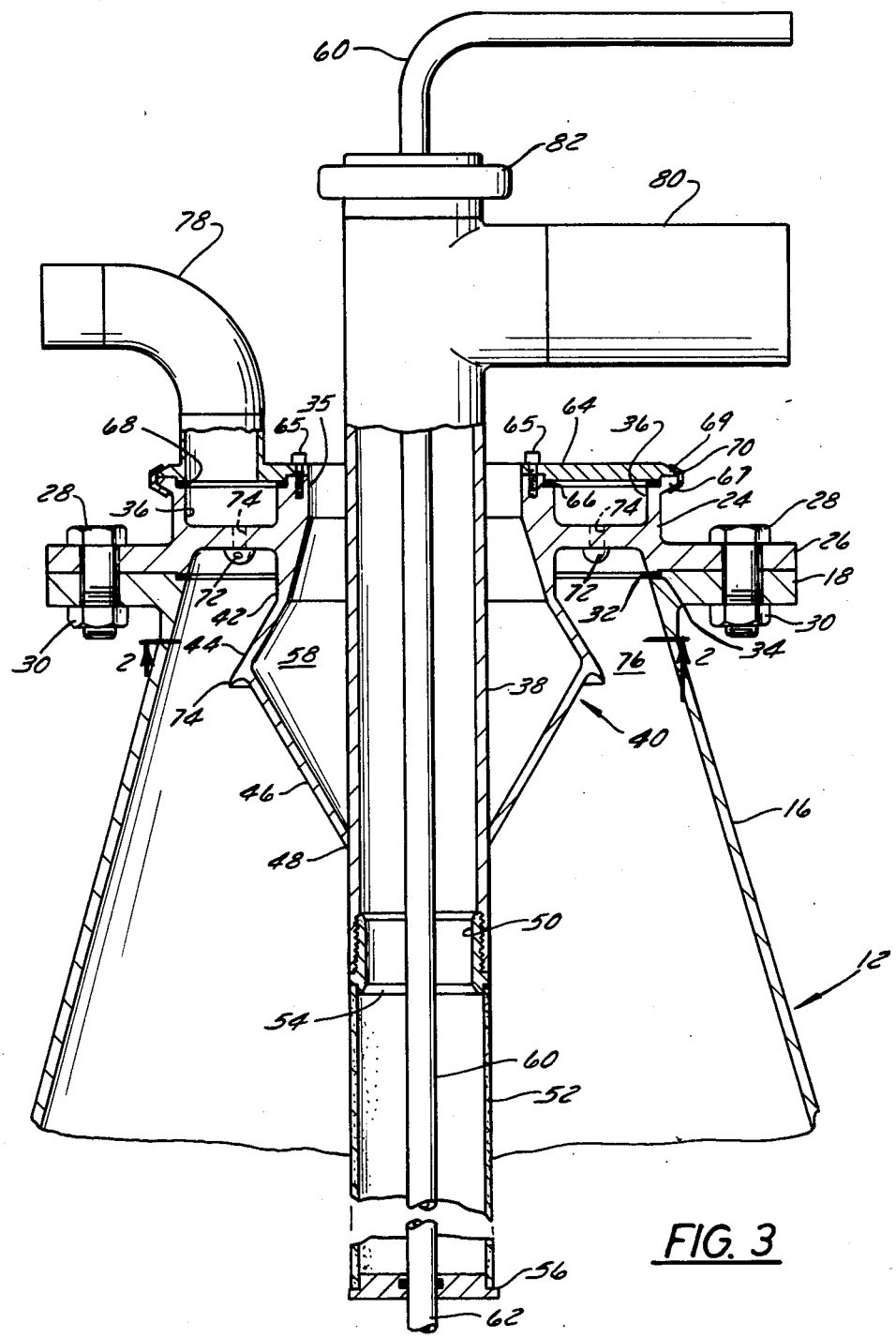
FIG. 3 is a view taken along line 3—3 of FIG. 2 showing the spray nozzle apparatus.
Figure 4:
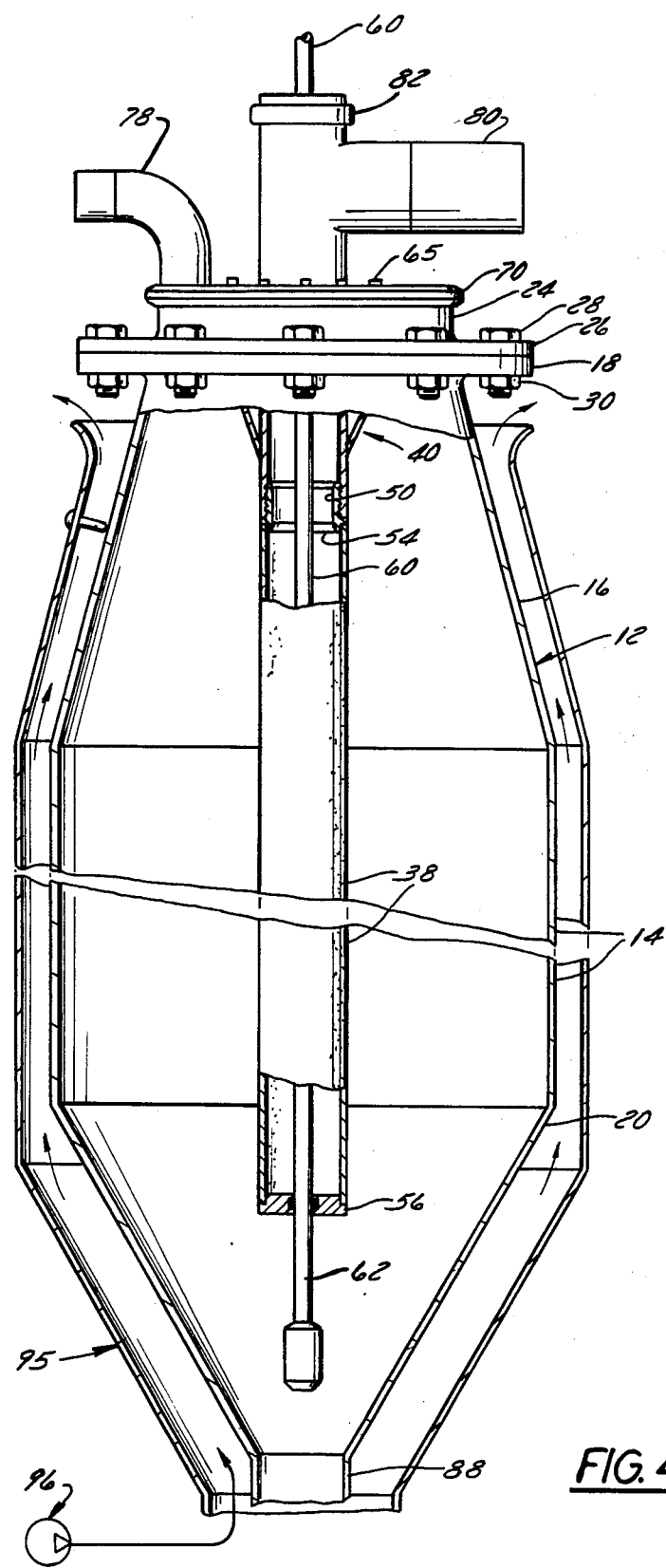
FIG. 4 is a side elevation sectional view of the infusion heating apparatus having an exterior cooling chamber mounted thereon.

Referring to FIGS. 1 through 3, the infusion heating apparatus generally includes a vertically upstanding closed vessel 12 have a generally cylindrical central portion 14 frusto-conical shaped upper section 16 having a mounting flange 18 and a lower section 20. The top of the upper section 16 is closed by means of a cover assembly 24. In this regard, the cover assembly 24 includes a flange 26 which is secured to the flange 18 on the upper end of the frusto-conical section 16 by means of bolts 28 and nuts 30. The flanges is sealed by means of a gasket 32 positioned in a notch 34 provided around the inner periphery of the flange 18.

The cover assembly 24 includes a central opening 35 and an annular distribution groove 36. A steam delivery pipe 38 is axially aligned in the opening 35 in the cover assembly 24 and is supported therein by means of a mounting assembly 40. In this regard, the assembly 40 includes a central cylindrical section 42 which depends from cover assessing 24 and terminates in a frusto-conical section 44. The steam delivery pipe 38 is supported on the frusto-conical section 44 by means of a gradually diminishing frusto-conical section 46 which terminates in a welded joint 48 with the steam pipe 38.

The steam delivery pipe 38 extends through the cylindrical section 42, frusto-conical section 44 and 46 downwardly to an internally threaded section 50. A steam distribution cylinder 52 is attached to the threaded section 50 of the steam pipe 38 by means of a threaded collar 54 secured to the end of the distribution cylinder 52. The lower end of the distribution cylinder 52 is closed by means of an end cap 56. The steam distribution cylinder 52 can be formed from porous-sintered stainless steel, ceramic, glass or plastic materials which allow for the passage of steam into the vessel 12 as described below. It should be noted that the steam pipe 38 is spaced from the cylindrical section 42 and frusto-conical sections 44 and 46 to provide an air space 58 which is open to the atmosphere through the opening 35 in cover assembly 24.

Means are provided in the steam pipe 38 for the discharge of gasses and air from the lower end of the closed vessel 12. Such means is in the form of a hollow tube 60 which extends axially through the entire length of the delivery pipe 38 and steam distribution cylinder 52 passing through the end cap 56. The projecting portion 62 of tube 60 terminates with a valve within the lower interior portion of the lower section 20 for sequencing the opening and closing of the tube 60.

As noted above, the cover assembly 24 includes an annular groove 36 which is closed by means of a cap 64 which is seated on the cover assembly 24 and secured thereto by means of bolts 65. The cap 64 is sealed to the cover plate 24 by means of gaskets 66 and 68. The outer flanged edges 67 and 69 of the cap 24 and cover plate 64, respectively, are closed by means of a V-clamp 70.

Referring to FIGS. 2 and 3, a plurality of shower devices 72 are provided on the bottom of the cover plate 24 in a concentric relation to the cylindrical section 42. The shower devices 72 are connected to the annular distribution groove 36 by means of passages 74. It should be noted that the shower devices 72 are equally spaced from the cylindrical section 42 and the outer wall of the upper section 16. The frusto-conical section 44 is spaced downwardly from the shower devices 72 and extends outwardly and downwardly terminating at a separator lip or edge 75 which deliminates a auxiliary chamber 76 at the top of the inside of the vessel 12. Liquid form material is introduced into the distribution channel 36 by means of a supply pipe 78 which is attached to the cap 64.

Steam is admitted to the steam supply pipe 38 by means of a steam inlet pipe 80 which is connected to a source of steam (not shown). The upper end of the steam pipe 38, which extends above the cove assembly 24, is closed by means of a cap 82 through which the air pipe 60 passes.

As seen in FIGS. 1 and 2, the lower end of the frusto-conical section 20 terminates in a cylindrical outlet 88.

As will be appreciated by those skilled in the art, methods of controlling the level of fluid product in the cylindrical outlet 88 of the vessel 12 have been known and used in infusion heaters for many years. For example, the use of gamma rays emitted to a target had been used to detect the level of fluid within the outlet 88 with sensing devices then being used to adjust the flow controls and rates. Additionally, pressure-sensitive diaphrams for sensing differential pressure within the vessel 12 based upon the level of liquid have also been employed to provide signals to flow control devices. These are not described in detail as their features and principals will be appreciated by those skilled in the field.

Means can be provided for cooling the outer surface of the vessel 12. Such means is in the form of a cooling jacket 95 which surrounds the outer surface of the vessel 12. A cooling fluid, in the form of an air or air having water droplets entrained can be forced through the jacket 95 by means of a compressor or pump 96.

Since the invention is primarily directed to sterilization of milk products, such as ice cream mix, the preferred method of operating the device will be described with reference to those types of product. The liquid form material is preheated generally to a temperature of 180 degrees to 185 degrees Fahrenheit and introduced into the distribution channel 36 via the product supply pipe 78. The product flows from the distribution channel 36 through the passages 74 and is sprayed into the auxiliary chamber 76 by means of the shower devices 72. The shower devices are directed, as seen in FIG. 3, to form a dense continuous rotating shower of droplets filling the auxiliary chamber and covering the walls of the frusto-conical section 44 and the interior wall of the frusto-conical section 16, cylindrical portion 14 and frusto-conical section 20.

With this arrangement, a dense shower of droplets will fill the auxiliary chamber 76 acting as a buffer between the steam from cylinder 52 and the surfaces of the auxiliary chamber. A film of liquid form material will form on the interior surfaces of the section 16 and section 44. A flowing film of liquid form material will cover the interior surfaces of the auxiliary chamber and the upper frusto-conical section 16.

The plurality of shower devices 72 are arranged around and spaced from the walls of the auxiliary chamber generating a rotating current of droplets. The pattern of the showers of droplets is extremely concentrated and intense and effectively forms a rotating current filling completely the generally annular space between the lip 75 and the entered surfaces of the vessel 12.

The auxiliary chamber 76 is in the uppermost portion of the vessel 12 and serves as an effective insulating and separating barrier between steam introduced into the vessel below the auxiliary chamber 76. This barrier effectively prevents the steam from contacting the surfaces of the upper auxiliary chamber and the product introduction (at nozzles), as well as the liquid form material as it forms on the interior surfaces of the vessel 12, thereby preventing burn-on from occurring anywhere in the apparatus and more particularly, the apparatus internal walls. The edge 75 on the end of the frusto-conical section 44 acts to separate the liquid form material away from the open surfaces of the steam distribution cylinder 52 and thereby avoid the creation of an intermediate zone in any portion of the vessel. The spray of liquid form material is initially relatively cool as it flows out of the spray nozzles 72. The shower of liquid form material is gradually heated as it travels down to the internal side walls of the vessel 12. The shower of liquid form material thus effectively supports and reinforces the film on the internal walls of the vessel. This film acts as an insulating and separating barrier between the steam and the interior side wall surfaces so as to keep the side wall surfaces themselves always cooler than the film itself.

During the process, saturated steam at a temperature of approximately 290 degrees Fahrenheit is introduced via the steam line 38 and diffused gently and evenly into the interior of the vessel 12 through the porous distribution cylinder 52. An operating pressure of 45 lbs. per square inch or less is used, and the diffused steam heats the falling spray droplets and the film on the internal walls of the vessel by infusion, near-instantly heating the liquid form material to the sterilization temperature.

As the steam is absorbed by the product and the Product temperature increases, there will be heavier air and gasses released from the product itself and remaining after the steam is condensed which will gravitate to the lower end of the vessel 12. These gasses are removed by means of the air removal pipe extension 60 which extends beyond the end of the porous cylinder 52. A valve may be provided on the end of pipe 62 to sequence the opening and closing of the pipe for air and gas removal. By providing for the removal of such air and gasses, the operating temperature and pressure of the steam can be lowered and more closely controlled and more closely maintained in proximity to the desired sterilization temperature of the top of the product.

The orientation of the spray nozzles 72 are shown in FIG. 3 where the spray pattern indicated by arrows 90 ranges from generally radial to tangential in direction relative to the cylinder section 42. Nozzles 72 are also angled downwardly as well. This orientation provides not only overlapping of the spray patterns, but would also create a generally circular rotating movement of shower droplets within the cooler auxiliary chamber space 76 and the vessel. The physical characteristics of the shower devices will vary depending upon the type of fluid product and its viscosity and surface tension in the case of an ice cream mix, for example. The shower devices are configured to release shower droplets of approximately 0.0625 inches diameter or smaller. The shower droplets, in addition to being directed radially downwardly, at an angle will also assist, strengthen, and support the flowing film of liquid form material along the internal surfaces of the vessel. Due to the high efficiency of heating, ice cream mix, for example, may be processed at the rate of 3,500 gallons per hour with the film introduced at velocities of two to three feet per second.

Because of the design of the apparatus, it is extremely easily cleaned as the configuration of the apparatus and liquid spray nozzles can in effect become a clean-in-place (CIP) system. To clean the vessel, it is merely necessary t inject cleaning fluid solutions through the liquid form material inlet line 78 into the annular channel 36 thereby permitting the cleaning solution to flow through the passageways 74 and shower devices 72 where it is distributed to the entire interior of the vessel. The CIP solution can also be introduced through the steam dispensing sintered metal filter 52. The invention has thus been described in relation to an apparatus for treating liquid form material. Others skilled in the art can appreciate that other food products in liquid form may also be sterilized as well, such as flavored milk, half and half, dairy creams, whipping creams, condensed milk, ice cream mix, shake mix, Puddings, custard, fruit juices, etc. Adjustments to the operating temperature and flow rates can be easily done as they have no influence on the operations of the apparatus and they can be easily addressed by those skilled in the field.

Accordingly, while one preferred embodiment of the invention has thus been described, the scope of the invention is not to be limited thereby, but solely based upon interpretation of the claims which follow.

The embodiments of the invention in which an exclusive property or privilege is claimed, are defined as follows:

1. An infusion heating apparatus comprising a generally vertically disposed hollow pressure vessel having a top, a bottom and sides walls, said side walls being sealed to the top and bottom of said vessel and having a central axis, spray means in said top for introducing a liquid form material into the top of said vessel in a form of a continuous shower of droplets of liquid form material onto said entire interior side wall surfaces of said vessel, steam dispensing means for dispensing saturated steam into said vessel for heating said liquid form material, said dispensing means being located along the central axis of said side walls and being spaced intermediate said top and bottom of said vessel in a spaced relation to said side walls and means for removing the heated liquid form material from the bottom of said vessel.

2. The apparatus as set forth in claim 1 wherein said introducing means includes a plurality of spray nozzles for introducing said liquid form material in a concentrated shower or spray of droplets in a generally annular zone extending around and spaced from the central axis of said vessel.

3. The apparatus as set forth in claim 2 wherein said steam dispensing means comprises a substantially porous cylinder having its axis in substantial alignment with said central axis and including steam delivery pipe means for delivering saturated steam from a source to said cylinder, said delivery pipe means extending downwardly from the top of said vessel and spaced from said introducing means.

4. The apparatus as set forth in claim 3 including mounting means intermediate said introducing means and said steam dispensing means for deflecting liquid product outwardly away from said steam dispensing means.

5. The apparatus according to claim 4 including means for cooling the exterior surfaces of said vessel.

6. The apparatus according to claim 1 wherein the top of said vessel includes a cover plate having an opening concentric with said axis of said vessel, said steam dispensing means being axially aligned with said opening, and means depending from said cover plate for supporting said dispensing means in a spaced relation to said opening, said supporting means including a cylindrical member spaced from the upper end of said dispensing means to define an air space around said dispensing means whereby the heat radiating from the upper end of the dispensing means will be vented through the opening in the cover plate to the atmosphere.

7. The apparatus according to claim 6 wherein said cylindrical member includes an upper frusto-conical section forming an auxiliary chamber at the upper inner portion of said top of said vessel.

8. An apparatus as set forth in claim 6 wherein said product introducing means includes a plurality of nozzle means for introducing a concentrated spray of droplets into said auxiliary chamber of said pressure vessel, said nozzle means also being adapted to form a continuously flowing film of product along the interior side walls of said vessel and along the side walls of said frusto-conical section.

9. The apparatus according to claim 8 including means for cooling the exterior surfaces of said vessel.

10. The apparatus according to claims 5 or 9 wherein said cooling means comprises a jacket surrounding the outer surface of said vessel and means for forcing a compressible fluid medium through the space between the jacket and the vessel.

11. An infusion heating apparatus comprising a generally vertically disposed hollow pressure vessel having a top, bottom and side walls, said sides walls being sealed to said top and bottom of said vessel and having a central axis, steam dispensing means for dispensing saturated steam into said vessel for heating said liquid form material, said dispensing means being located along the central axis of said vessel and being spaced intermediate said top and bottom of said vessel in a spaced relation to the vessel side walls and a plurality of spray nozzles mounted in a circle in said top of said vessel and directed to introduce a continuous rotating shower of droplets of liquid form material between the entire interior side wall surfaces of said vessel and said steam dispensing means, means mounted below said spray nozzles and above said steam dispensing means for separating the shower of droplets from said steam dispensing means, and means for removing the heated liquid form material from said bottom of said vessel.

12. The apparatus as set forth in claim 11 wherein said steam dispensing means comprises a substantially porous cylinder having its axis in substantially alignment with the central axis of said vessel and including steam delivery pipe means for delivering saturated steam from a source to said cylinder, said delivery pipe means extending downwardly through said top of said vessel and being spaced from said introducing means.

13. The apparatus according to claim 11 wherein said top of said vessel includes a cover plate having an opening concentric with the axis of said vessel, said steam dispensing means being axially aligned with said opening, and means depending from said cover plate for supporting said dispensing means in a spaced relation to said opening, said supporting means including a cylindrical member spaced from the upper end of said dispensing means to define an air space around said dispensing means whereby the heat radiating from the upper end of said dispensing means will be vented through the opening in the cover plate to the atmosphere.

14. The apparatus according to claim 5 wherein said deflecting means comprises an upper frusto-conical section on said cylindrical member which forms an auxiliary chamber at the upper inner portion of said vessel.

* * * * *